(12) United States Patent
Robinson

(10) Patent No.: US 6,539,695 B1
(45) Date of Patent: Apr. 1, 2003

(54) SEEDPOD HARVESTER

(75) Inventor: Clell Robinson, Sommerfield, FL (US)

(73) Assignee: Gleaner, L.L.C., Ocala, FL (US)

( * ) Notice: Subject to any disclaimer, the term of this patent is extended or adjusted under 35 U.S.C. 154(b) by 0 days.

(21) Appl. No.: 09/789,218

(22) Filed: Feb. 20, 2001

Related U.S. Application Data

(60) Provisional application No. 60/184,472, filed on Feb. 23, 2000.

(51) Int. Cl.⁷ .............................................. A01D 45/00
(52) U.S. Cl. ........................................ 56/327.1; 56/126
(58) Field of Search ..................... 56/126–130, 327.1, 56/330, 331, 109, 128, 13.2, DIG. 19, 328.1; 171/21, 26, 27, 28, 42

(56) References Cited

U.S. PATENT DOCUMENTS

| | | | |
|---|---|---|---|
| 1,264,780 A | * 4/1918 | Duhem ........................ 56/330 |
| 3,705,483 A | * 12/1972 | Jarrell et al. .................. 56/13.5 |
| 3,855,760 A | * 12/1974 | Smith, Jr. et al. ............. 56/13.2 |
| 3,892,061 A | * 7/1975 | Whitley ....................... 56/27.5 |
| 3,989,111 A | 11/1976 | Hobbs |
| 4,106,193 A | * 8/1978 | Fisher et al. .................. 30/172 |
| 4,196,570 A | * 4/1980 | Rodriguez .................... 56/126 |
| 4,200,947 A | * 5/1980 | Ali .............................. 15/198 |
| 4,230,188 A | 10/1980 | Paulk |
| 4,232,744 A | 11/1980 | Thompson |
| 4,257,486 A | 3/1981 | Hobbs |
| 4,607,703 A | 8/1986 | Wang |
| 4,685,388 A | 8/1987 | Chen |
| 4,687,064 A | 8/1987 | Johnson |
| 5,205,114 A | 4/1993 | Hobbs |
| 5,257,486 A | 11/1993 | Holmwall |
| 5,577,562 A | 11/1996 | Gresham |
| 5,588,494 A | 12/1996 | Picket et al. |
| 5,980,382 A | 11/1999 | Brantley et al. |
| 5,987,861 A | * 11/1999 | Duncan et al. ............... 56/14.4 |
| 6,338,236 B1 | * 1/2002 | Rodriguez ................... 56/327.1 |

* cited by examiner

*Primary Examiner*—Robert E. Pezzuto
(74) *Attorney, Agent, or Firm*—Christine Q. McLeod; Beusse, Brownlee, Bowdoin & Wolter

(57) ABSTRACT

A device for digging and harvesting seed pods from plant roots, in particular, a device for digging and harvesting peanuts, where after the peanut plants are removed from the ground, the peanuts are removed from the peanut plant root system. The device comprises a harvesting head which includes three essential components for performing the requisite function, namely a shaft, a pair of circular hubs and at least one set of tines. A self-cleaning member is also provided.

23 Claims, 3 Drawing Sheets

SEEDPOD HARVESTER

CROSS-REFERENCE TO A RELATED APPLICATION

This application claims the benefit of U.S. Provisional Application No. 60/184,472, filed Feb. 23, 2000, incorporated herein by reference.

BACKGROUND OF THE INVENTION

1. Field of the Invention

The present invention relates to a device for digging and harvesting seed pods from plant roots, in particular, a device for digging and harvesting peanuts, where after the peanut plants are removed from the ground, the peanuts are removed from the peanut plant root system.

2. Description of the Related Art

Unlike many crops, peanuts have a very short harvest window in which the peanuts may be harvested while obtaining close to the maximum yield. If the peanuts are harvested too early, a considerable amount of the crop will be immature and unusable. If the peanuts are harvested too late, many of the peanuts will have rotted, and the effective yield will be decreased. While the exact harvest window varies by the type of peanut, a typical harvest time for peanuts is 145 days, with the harvest window being plus or minus four days. This narrow window requires that farmers harvest the peanuts as rapidly as possible.

The conventional method of harvesting the peanuts from the peanut plants is performed manually. Farmers manually dig up the peanut plant, exposing the plant root system and peanuts. The soil is shaken from the root system exposing the peanuts, then the peanuts are removed and collected. The manual harvesting of peanuts takes many man hours of labor, being inefficient and costly.

In an effort to decrease costs and increase efficiency, mechanical harvesters have been invented which dig up the peanut plants, exposing the plant roots system and peanuts. The peanut plants are first progressively dug from the ground exposing the plant root system and peanuts. The plants are then passed along a conveyer, where the soil is shaken from the plant root system. At the end of the conveyer, the plants are deposited on the ground in the inverted position, with the peanut being on top of the plant. Examples of such plant invertors are disclosed in U.S. Pat. No. 5,588,494 to Pickett, et al., for a Crop inverter and method for using same, and U.S. Pat. No. 5,257,486 to Hobbs, for a Multiple row harvester for peanut crops. After inversion, the peanuts are subsequently manually picked from the roots. As with manual harvesting, this can be time consuming, and have high labor costs.

Subsequently, there have been attempts to design a machine which both digs up the peanut plants and removes the peanuts from the plant root system. Examples of such devices are disclosed in U.S. Pat. No. 4,607,703 to Wang, for a Peanuts harvester and harvesting method, where the picking head uses rakes to strip the peanuts from the plant root system; U.S. Pat. No. 4,685,388 to Chen, for a Device to remove peanuts from the root thereof, where the picking head twists the peanuts until they are removed from the plant root; and U.S. Pat. No. 4,687,064 to Johnson, for Green peanut harvester, where the picking head removes the peanuts from the plant root system by using a saw-toothed picking comb. In addition to using a picking head, some have attempted to use combines to harvest peanuts, including U.S. Pat. No. 5,205,114 to Hobbs, for a Peanut Combine, and U.S. Pat. No. 5,980,382 to Brantley, et al., for a Self-propelled peanut combine. The above-mentioned mechanical peanut harvesters have several disadvantages, including the tangling of the mechanical systems with the peanut plant's roots and the damaging of the harvested peanuts, be it the bruising or breaking of the peanut pods. Such problems can decrease the efficiency of the mechanical harvester and decrease the quality and quantity of the yield. Currently, there still remains a need for a simple, efficient and cost effective device for harvesting peanuts.

All patents, patent applications and publications referred to or cited herein, or from which a claim for benefit of priority has been made, including: U.S. Pat. No. 3,989,111 to Hobbs, U.S. Pat. No. 4,230,188 to Paulk, U.S. Pat. No. 4,232,744 to Thompson, U.S. Pat. No. 4,257,486 to Hobbs, U.S. Pat. No. 4,607,703 to Wang, U.S. Pat. No. 4,685,388 to Chen, U.S. Pat. No. 4,687,064 to Johnson, U.S. Pat. No. 5,205,114 to Hobbs, U.S. Pat. No. 5,577,562 to Gresham, U.S. Pat. No. 5,588,494 to Pickett, et al., and U.S. Pat. No. 5,980,382 to Brantley, et al. are incorporated by reference in their entirety to the extent they are not inconsistent with the explicit teachings of this specification.

BRIEF SUMMARY OF THE INVENTION

The present invention solves the problems in the art by providing a harvesting head which includes three components for performing the requisite function, namely a shaft, a pair of circular hubs and at least one set of tines. The hubs are securely mounted onto the shaft in a parallel relationship. A set of tines is securely mounted onto the outer edges of a first hub, so that tines are mounted as mirror images of one another, forming a "V" shaped channel section extending into an elongated harvesting section with two parallel members forming an "L" shape. The harvesting section is spring loaded in compression and can automatically adjust for different size root systems.

When in use, the harvesting head is preferably mounted into any suitable device which rotates the harvesting head. As the harvesting head is rotated, the peanut plant's root system enters the "V" channel section of a set of tines and is funneled toward the elongated harvesting section. As the harvesting head rotates, the plant's roots then pass through the harvesting section and the peanuts are pulled from the plant's roots. Alternatively, the harvesting head can be mounted onto a digger-shaker or a digger-shaker-inverter, which automatically digs up the peanut plants and conveys them to the harvesting head, for harvesting and collection of the peanuts.

It is an objective of the present invention to provide a seed pod harvesting head to remove seed pods from a plant's root system, without damaging the seed pods or tangling the device in the plant's root system.

It is another objective of the present invention to provide a seed pod harvesting device which can be simply and efficiently operated.

DETAILED DISCLOSURE OF THE INVENTION

Figure 1:
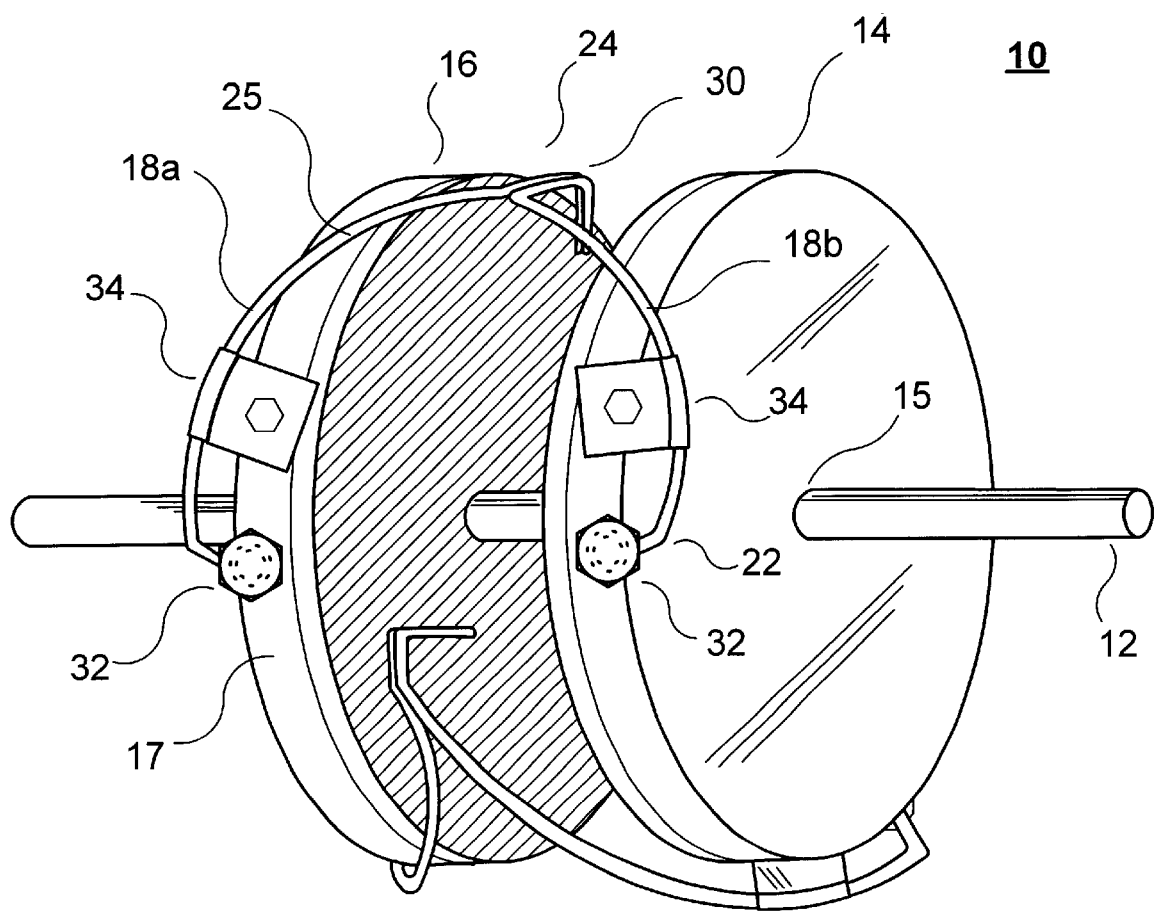
FIG. 1 shows a perspective view of the harvesting head of one embodiment of the present invention.

In the device as shown in FIG. 1, the harvesting head 10 includes three components for performing the requisite function, namely a shaft 12, a pair of circular hubs 14 and 16, and at least one set of tines 18, where a set of tines comprises a pair of tine members 18a and 18b One tine member is the mirror image of the other tine member.

The first hub 14 and second hub 16 are securely mounted onto the shaft 12 through their central axes 15, where the first and second hubs 14 and 16 are parallel to one another. The diameter of the first and second hub 14 and 16 is of a sufficient size so that the shaft is below the flow of peanuts. In a preferred embodiment, the diameter of the hubs 14 and 16 is about 10 to 12 inches. Additionally, the distance between the first hub 14 and second hub 16 is such that a peanut plant's root system can pass between the hubs 14 and 16.

Figure 2:
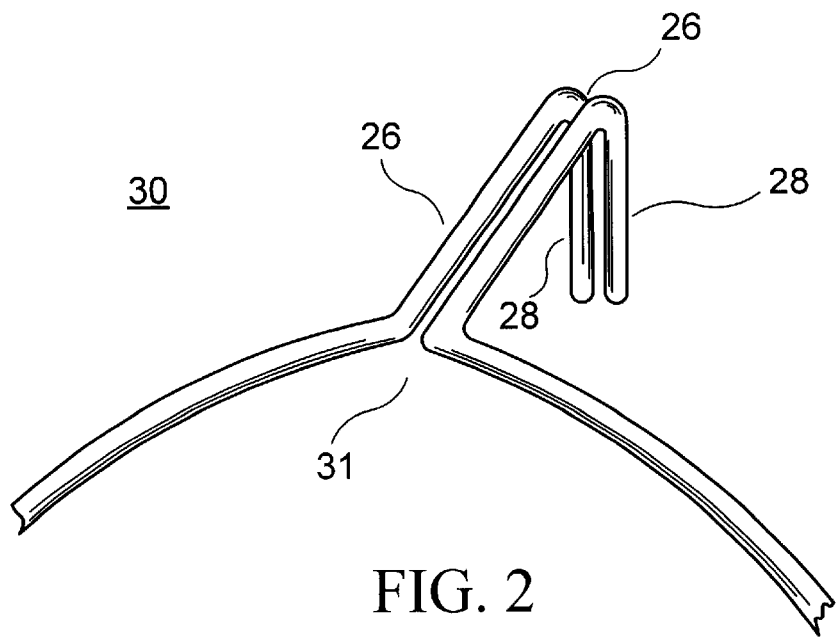
FIG. 2 shows a perspective view of the harvesting section of one embodiment of the present invention.

The set of tines 18 comprises a pair of tine members 18a and 18b, where a first tine member 18a is the mirror image of the second tine member 18b, mounted to the first and second hub 14 and 16. The first tine member 18a comprises a proximal end 22 and a distal end 24, where the proximal end 22 is affixed to the outer edge 17 of the first hub 14. The first tine member 18a is removably affixed to the first hub 14, such that the tine member 18a can be replaced when damaged or worn out. In a preferred embodiment, the tine member 18a is secured to the hub 14 with a bolt 32 which is passed through an eye located at the proximal end 22 of the first tine member 18a. Additionally, a secondary bracket 34 is used to secure the tine member 18a to the hub 14 and also maintain the tine member 18a in the proper orientation. The body 25 of the tine comprises an arch which matches the arch of the hub 14 and is at an angle such that the distal end 24 is positioned midway between the first hub 14 and second hub 16. The distal end 24 comprises a first section 26 and a second section 28, where the first section 26 is parallel to the hub 14, and the second section 28 is perpendicular to the first section 26, directed towards. the shaft 12 as shown in FIG. 2. The first section 26 and second section 28 are of sufficient lengths to remove the peanuts from the peanut plant root system. The second tine member 18b is mounted onto the second hub 16 in the same manner as the first tine member 18a onto the first hub 14 and as a mirror image of the first tine member 18a, such that the distal ends 24 of the first tine member 18a and second tine member 18b compress to form the elongated "L" shaped harvesting section 30 and the bodies 25 form a "V" shaped channeling section 31. The harvesting section 30 is spring loaded in compression and can automatically adjust for different sized root systems.

In alternative embodiments, the diameter of the hubs 14 and 16 and the distance between the hubs 14 and 16 may be of different sizes and lengths to accommodate different size root systems for different plant species.

In an alternative embodiment, the shaft 12 has a stationary cover or shield mounted between the first and second hubs 14 and 16, to prevent any wrapping or accumulation of the plant roots about the shaft 12.

In a preferred embodiment, the harvesting head 10 has at least three sets of tines 18 mounted onto the hubs 14 and 16, where the sets of tines 18 are mounted at equal distances along the circumference of the hubs 14 and 16 from each other. However, any number of sets is contemplated herein.

In operation, the harvesting head 10 is mounted onto any suitable device which can rotate the harvesting head 10. The harvesting head 10 is positioned such that the peanut plant roots hang above the shaft 10. As the harvesting head 10 is rotated, the peanut plant's root system enters the "V" shaped channel section 31 of a set of tines 18. The plant's roots are funneled through the "V" shaped channeling section 31 into the harvesting section 30. The plant's roots apply a force onto the harvesting section 30 which is sufficient in strength to separate the distal ends 24 of the tine members 18a and 18b, opening the "L" shaped harvesting section 30 The plant's roots then pass into the first leg 26 of the harvesting section 30, where the plant's roots are bunched and aligned. The plant's roots then pass into the second leg 28 of the harvesting section 30. As the harvesting head 10 rotates, the second leg 28 becomes perpendicular to the plant's roots and pulls the peanuts from the plant's roots so that the peanuts are removed and can fall into a catch bin or other collection means.

Figure 3:
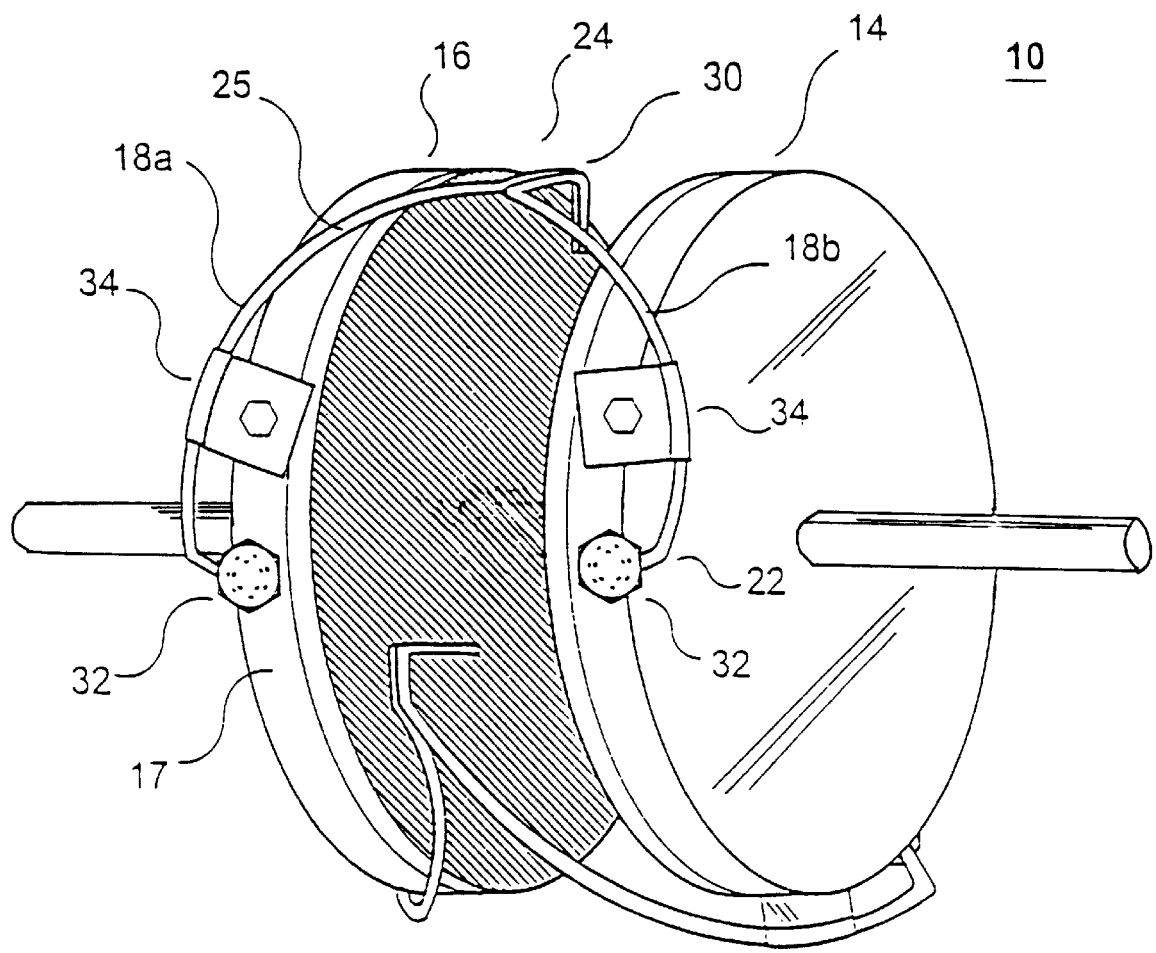
FIG. 3 shows a perspective view of the shaftless harvesting head of another embodiment of the present invention.

In an alternative embodiment, as shown in FIG. 3, the subject invention comprises a pair of circular hubs 14 and 16, and at least one set of tines 18, where a set of tines 18 comprises a pair of tine members 18a and 18b. One tine member is the mirror image of the other tine member. The first time member 18a is removably affixed to the first hub 14, such that the first tine member 18a can be replaced when damaged or worn. The second tine member 18b is mounted onto the second hub 16 in the same manner as the first tine member 18a is mounted onto the first hub 14.

In operation, the circular hubs 14 and 16 are individual mounted onto a suitable device, such that the circular hubs 14 and 16 are parallel to each other. The hubs 14 and 16 are align such that the distal ends 24 of the first tine member and 18a the second tine member 18b compress to form the elongated substantially "L" shaped harvesting section 30 and the bodies from a substantially "V" shaped channeling section 31.

The hubs 14 and 16 are connected to a synchronized drive means, such that the first and second tines 18a and 18b remain in alignment as hubs 14 and 16 rotate. For example, the drive means can include, but not be limited to, the hubs 14 and 16 each being connected to a single drive motor with a pair of chains or belts. The single drive motor simultaneously rotates the hubs 14 and 16 such the first and second tines 18a and 18b remain in alignment.

Figure 4:
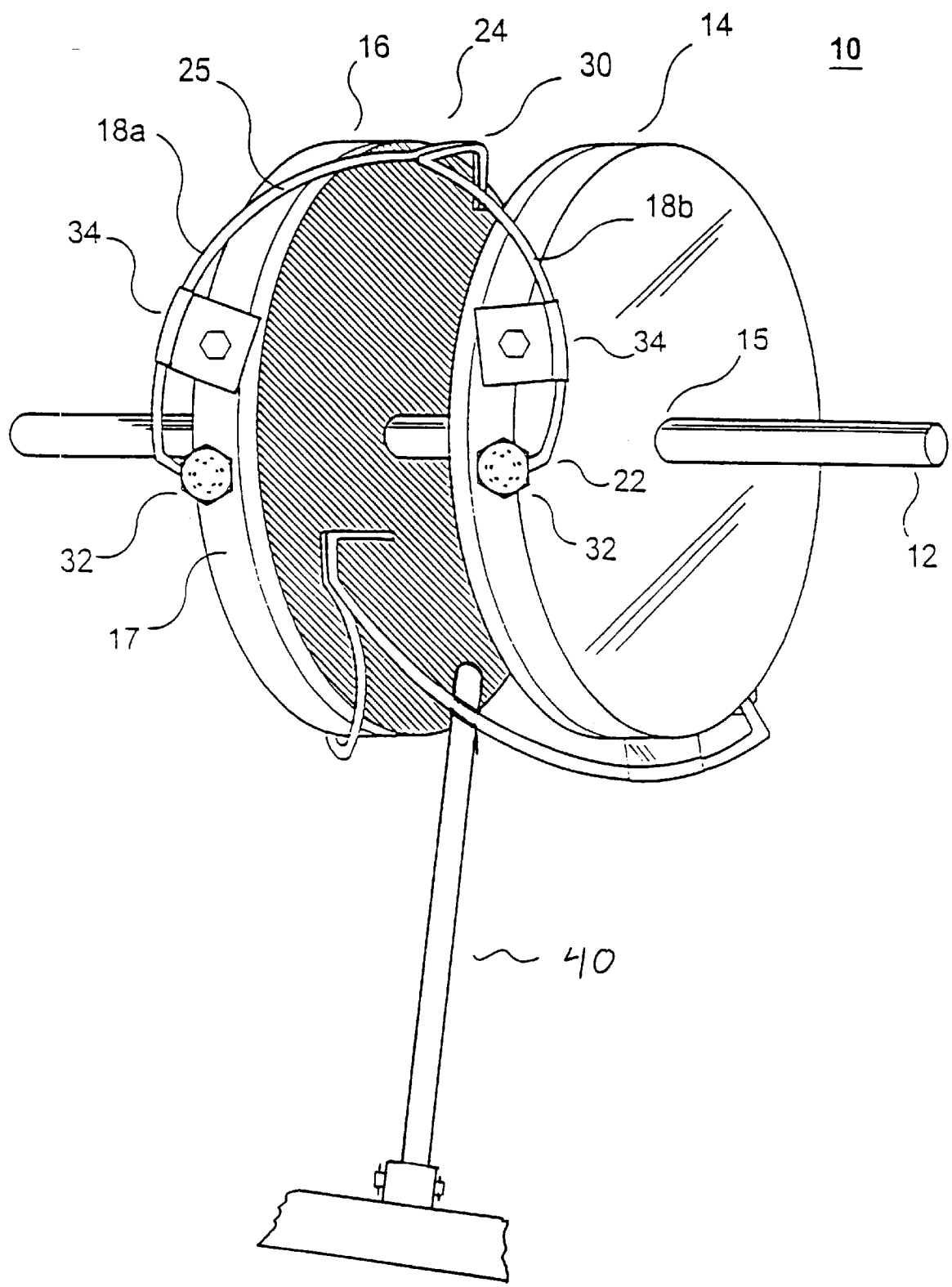
FIG. 4 show a perspective view of the self cleaning means of the present invention.

In a further embodiment, as shown in FIG. 4, the subject invention further comprises a self cleaning means. In an example, the self cleaning means comprises a rod 40 centrally mounted and parallel to the hubs 14 and 16, such that as the hubs 14 and 16 rotate the rod passes through the substantially "V" shaped channeling section 31 and substantially "L" shaped harvesting section 30, removing debris. The rod may be permanently positioned or movable into its cleaning position as desired.

In an alternative embodiment, the harvesting head 10 is mounted onto a digger-shaker or a digger-shaker-inverter. A digger-shaker utilizes a digging means, a conveying means and a shaking means. The digger-shaker may be of an entirely conventional configuration and construction such as disclosed, for example, in U.S. Pat. No. 3,726,345, the details of which are incorporated by reference.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A seedpod harvesting head, for attachment to a seedpod harvester, comprising:

a) a pair of hubs, wherein said hubs are affixed to said seedpod harvester such that said hubs are substantially in parallel to each other forming a passage therebetween and rotate about a central axis; and b) at least one pair of tines wherein one of said tines is removably affixed to one of said hubs and the other of said tines is removeably affixed to the other of said hubs, said tines extending across said passage and converging substantially midway between said hubs.

2. The seedpod harvesting head according to claim 1, wherein said pair of tines converge to form a "V" channel section across said passage for funneling the root system of a plant toward a harvesting section of said pair of tines as the hub rotates.

3. The seedpod harvesting head according to claim 2, wherein said harvesting section comprises a distal end of said tines spaced in a parallel "L" shaped position for aligning the root system and then stripping the seedpods from the plant as the hub continues to rotate.

4. The seedpod harvesting head according to claim 1, wherein said hubs are mounted on a shaft through said central axis.

5. The seedpod harvesting head according to claim 4, further comprising a protective shield mounted about said shaft.

6. The seedpod harvesting head according to claim 1, wherein said set of tines comprise a first tine member and a second tine member, each of said tine members comprising a proximal end and a distal end, said proximal ends being removably affixed to an outer edge of said hubs, such that said distal ends are positioned to converge substantially midway between said hubs across said passage.

7. The seedpod harvesting head according to claim 6, wherein said distal ends comprise a first section and a second section, said first section is parallel to said hubs and said second section is perpendicular to said first section.

8. The seedpod harvesting head according to claim 7, wherein said first sections of said tine members form a narrow channeling section through which the root system of a plant is aligned as the hubs rotate.

9. The seedpod harvesting head according to claim 7, wherein said second sections of said tine members form a harvesting section through which the seedpods are stripped from the plant as the hubs rotate.

10. The seedpod harvesting head according to claim 9, wherein said harvesting section is self adjusting.

11. The seedpod harvesting head according to claim 10, further comprising a self-cleaning means.

12. The seedpod harvesting head according to claim 11, wherein said self-cleaning means comprises a rod having a first end affixed to said seedpod harvesting machine and a second end positioned between said tines, such that as said pair of hubs rotate, said second end of said rod removes any accumulated debris from said harvesting section.

13. The seedpod harvesting head according to claim 1, wherein said harvesting head comprises at least three sets of pairs of tines.

14. A seedpod harvesting machine comprising:

a) means for removing a seedpod plant from the ground;

b) means for conveying said seedpod plant to a harvesting head, wherein said harvesting head comprises a pair of hubs affixed to said seedpod harvesting machine such that said hubs are substantially in parallel to each other forming a-passage therebetween and rotate about a central axis, and at least one pair of tines wherein one of said tines is removably affixed to one of said hubs and the other of said tines is removeably affixed to the other of said hubs, said tines extending across said passage and converging substantially midway between said hubs; and c) drive means operatively connected to said harvesting head for rotation.

15. The seedpod harvesting machine according to claim 14, wherein said seedpod harvesting head comprises at least three sets of pairs of tines.

16. The seedpod harvesting machine according to claim 14, wherein said drive means comprises a drive shaft operatively connected to a drive motor, wherein said hubs are mounted on said drive shaft through said central axis.

17. The seedpod harvesting machine according to claim 14, wherein said drive means comprises at least one drive motor independently connected to said hubs, such that said drive motor simultaneously rotates said hubs in a synchronized manner.

18. The seedpod harvesting machine according to claim 14, further comprising a self-cleaning means.

19. The seedpod harvesting machine according to claim 18, wherein said self-cleaning means comprises a rod having a first end affixed to said seedpod harvesting machine and a second end positioned between said tines, such that as said pair of hubs rotate, said second end of said rod removes any accumulated debris from said tines.

20. A method of harvesting seedpods from a plant comprising the following steps:

a) removing a plant from the ground;

b) conveying said plant to a harvesting head;

c) removing seedpods from said plant by positioning said seedpods within a harvesting head, wherein said harvesting head comprises a pair of hubs affixed to a seedpod harvester such that said hubs are substantially in parallel to each other forming a passage therebetween and rotate about a central axis, and at least one pair of tines wherein one of said tines is removably affixed to one of said hubs and the other of said tines is removeably affixed to the other of said hubs, said tines extending across said passage and converging substantially midway between said hubs.

21. A harvesting head for removing seedpods from a plant's root system, comprising:

a) a pair of parallel spaced rotating hubs forming a passage therebetween; and b) at least one pair of tines mounted onto an outer edge of each of said hubs, wherein said tines extend across said passage to converge toward a central axis of said hubs forming a "V" shaped channel section and extending into an elongated harvesting section forming an "L" shape, so that as said harvesting head rotates, the plant's roots are channeled into said harvesting section and the seedpods are pulled from the plant's roots as the roots pass between the tines.

22. The harvesting head of claim 1, wherein said harvesting section is spring loaded in compression to adjust for different root sizes.

23. The harvesting head of claim 1, further comprising a rod centrally positioned between the hubs to pass through the channel section and the harvesting section as the hubs rotate to remove debris.

* * * * *